(12) United States Patent
Oidate

(10) Patent No.: US 10,747,546 B2
(45) Date of Patent: Aug. 18, 2020

(54) DISTRIBUTED ALLOCATION DEVICE, DISTRIBUTED ALLOCATION SYSTEM, AND DISTRIBUTED ALLOCATION METHOD

(71) Applicant: Mitsubishi Electric Corporation, Chiyoda-ku (JP)

(72) Inventor: Shingo Oidate, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/604,803

(22) PCT Filed: Jun. 19, 2017

(86) PCT No.: PCT/JP2017/022465
§ 371 (c)(1),
(2) Date: Oct. 11, 2019

(87) PCT Pub. No.: WO2018/235124
PCT Pub. Date: Dec. 27, 2018

(65) Prior Publication Data
US 2020/0159540 A1 May 21, 2020

(51) Int. Cl.
*H04L 12/00* (2006.01)
*G06F 9/38* (2018.01)
(Continued)

(52) U.S. Cl.
CPC .......... *G06F 9/3891* (2013.01); *G06F 9/3004* (2013.01); *G06F 9/4881* (2013.01); *G06F 9/5016* (2013.01)

(58) Field of Classification Search
CPC .... G06F 9/4881; G06F 9/5027; G06F 9/5038; G06F 9/50; G06F 9/5083; G06F 9/505;
(Continued)

(56) References Cited

U.S. PATENT DOCUMENTS 5,642,508 A * 6/1997 Miyazawa ............ G06F 9/5027
718/104
9,471,383 B2 * 10/2016 Paul ........................ G06F 9/505
(Continued)

FOREIGN PATENT DOCUMENTS

JP 2010-27062 A 2/2010

OTHER PUBLICATIONS

International Search Report dated Sep. 19, 2017 in PCT/JP2017/022465 filed Jun. 19, 2017.

*Primary Examiner* — Frantz Coby
(74) *Attorney, Agent, or Firm* — Xsensus LLP

(57) ABSTRACT

Computing processes are allocated to a plurality of computing nodes while taking a precedence constraint among a plurality of computing processes into consideration even when a deadline is longer than a period of the computing process. In a distributed allocation device, a creation unit determines an order to execute the computing processes based on the precedence constraint, and creates a constraint condition equation satisfying the deadline based on an execution time of the computing processes and a data communication volume among the computing processes. If the deadline is longer than the entire period, the creation unit creates the constraint condition equation which does not allocate an other computing process during execution of an excess computing process, in the subsequent entire period, to the computing node to which the excess computing process is to be allocated, which is executed past the entire period.

9 Claims, 9 Drawing Sheets

(51) Int. Cl.
*G06F 9/30* (2018.01)
*G06F 9/50* (2006.01)
*G06F 9/48* (2006.01)

(58) Field of Classification Search
CPC ..... G06F 9/4887; G06F 9/544; H04L 64/403; H04L 12/5695
USPC .................. 709/201, 202, 203, 226; 718/104
See application file for complete search history.

(56) References Cited

U.S. PATENT DOCUMENTS

| | | | | |
|---|---|---|---|---|
| 9,753,782 | B2* | 9/2017 | Fang | H04L 67/1008 |
| 10,185,591 | B2* | 1/2019 | Sato | G06F 9/4881 |
| 2003/0187907 | A1* | 10/2003 | Ito | G06F 9/4887 |
| | | | | 718/102 |
| 2009/0254660 | A1* | 10/2009 | Hanson | H04L 12/10 |
| | | | | 709/226 |
| 2011/0161406 | A1* | 6/2011 | Kakeda | G06F 3/0649 |
| | | | | 709/203 |
| 2014/0019509 | A1* | 1/2014 | Masukawa | G06F 9/544 |
| | | | | 709/201 |
| 2014/0298350 | A1* | 10/2014 | Kimata | G06F 9/5027 |
| | | | | 718/104 |
| 2015/0334173 | A1* | 11/2015 | Coulmeau | G06F 9/4887 |
| | | | | 709/203 |
| 2016/0011908 | A1* | 1/2016 | Paul | G06F 9/505 |
| | | | | 718/104 |
| 2016/0019094 | A1* | 1/2016 | Habdank | G06F 9/5083 |
| | | | | 718/104 |
| 2017/0010918 | A1* | 1/2017 | Sato | G06F 9/4881 |
| 2017/0024247 | A1* | 1/2017 | Evripidou | G06F 9/45558 |
| 2017/0109207 | A1* | 4/2017 | Li | G06F 9/505 |
| 2017/0315544 | A1* | 11/2017 | Tateno | G05B 19/042 |
| 2018/0024862 | A1* | 1/2018 | Nakagawa | G06F 9/50 |
| | | | | 718/104 |
| 2018/0032123 | A1* | 2/2018 | Imade | G06F 1/329 |
| 2018/0329752 | A1* | 11/2018 | Kokubo | G06F 9/5066 |

* cited by examiner

FIG. 7

| PRECEDENCE CONSTRAINT | COMMUNICATION VOLUME |
|---|---|
| J1→J2 | 50MByte |
| J1→J3 | 50MByte |
| J2→J4 | 10MByte |
| J3→J4 | 10MByte |

FIG. 8

UNIT (msec)

|     | J1 | J2 | J3 | J4 |
|---|---|---|---|---|
| N1  | -  | 5  | 5  | 5  |
| N2  | -  | 10 | 10 | -  |
| N3  | -  | 10 | 10 | -  |
| N4  | -  | 10 | 10 | -  |
| N5  | 10 | 20 | 20 | -  |
| N6  | -  | 20 | 20 | -  |
| N7  | -  | 20 | 20 | -  |
| N8  | -  | 30 | 30 | -  |
| N9  | -  | 30 | 30 | -  |
| N10 | -  | 30 | 30 | -  |

F I G. 1 1

| | | \multicolumn{5}{c}{TRANSMISSION DESTINATION} |
|---|---|---|---|---|---|---|
| | | N1 | N2 | N3 | ... | N10 |
| TRANSMISSION SOURCE | N1 | – | N1→SW1→N2 | N1→SW1→N3 | ... | N1→SW1→N4→SW3→N10 |
| | N2 | N2→SW1→N1 | – | N3→SW1→N2 | ... | N2→SW1→N4→SW3→N10 |
| | N3 | N3→SW1→N1 | N3→SW1→N2 | – | ... | N3→SW1→N4→SW3→N10 |
| | ... | ... | ... | ... | ... | ... |
| | N10 | N10→SW3→N4→SW1→N1 | N10→SW3→N4→SW1→N2 | N10→SW3→N4→SW1→N3 | ... | – |

F I G. 1 4
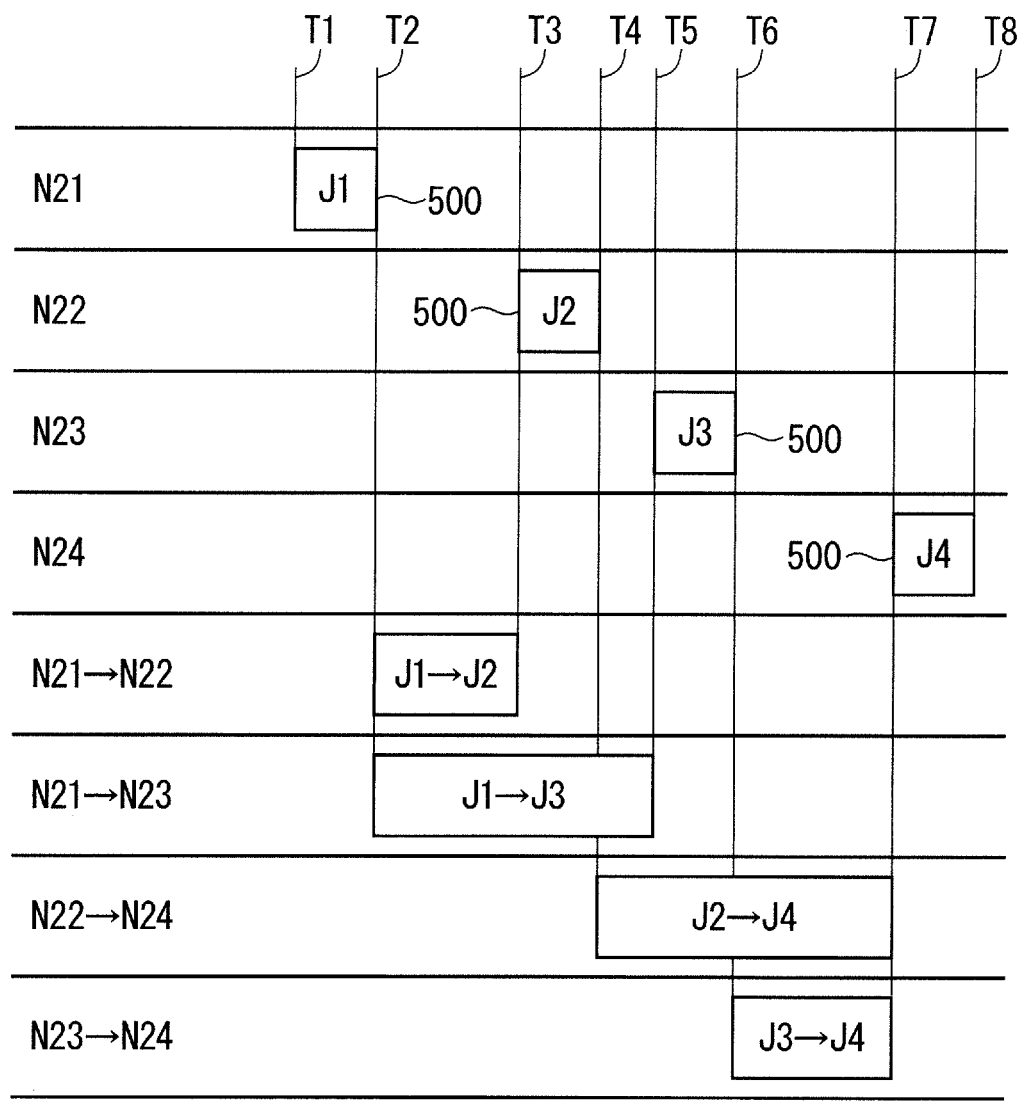

DISTRIBUTED ALLOCATION DEVICE, DISTRIBUTED ALLOCATION SYSTEM, AND DISTRIBUTED ALLOCATION METHOD

TECHNICAL FIELD

A technique disclosed in the present specification relates to, for example, a technique that allocates computing processes to a plurality of computing nodes.

BACKGROUND ART

In recent years, in factory automation (FA) field and the like, after acquiring data such as sensing data or operation logs periodically and aggregating the data to a cloud server or the like, the data is processed and analyzed, thereby, failure prediction or improvement of productivity for a control device has been carried out. Note that the data collection period may differ from data to data.

Accordingly, aggregating data to a single server increases the processing load on the server and increases the access load on the server, resulting in a tight network around the server. Tight network around the server may cause problems with data analysis not completing within a desired time, that is, within a deadline.

For this reason, computing processes relating to data processing and analysis may be distributed and allocated to a plurality of computing nodes included in the network, that is, decentralization of the computing processing.

As a method of allocating computing processes to computing nodes, there is, for example, a method in which the deadline that is the required time from the start to the end of a computing process, a period during which the calculation process is executed, a computing amount and a communication volume, and the like, are set in advance, and executing allocation that satisfies a deadline by contacting each computing node before the allocation (see, for example, Patent Document 1).

PRIOR ART DOCUMENTS

Patent Documents

[Patent Document 1] Japanese Patent Application Laid-Open No. 2010-27062

SUMMARY

Problem to be Solved by the Invention

Among a plurality of computing processes, there may be a relation with a precedence constraint such that another computing process performs data analysis on data processed by a certain computing process.

However, for example, Patent Document 1 does not take a computing process group connected with precedence constraints into consideration. Therefore, it is necessary to set an appropriate deadline for each computing process. The setting of the deadline is required to take the precedence constraints, the data communication volume, and the execution time of the process into consideration, and is difficult to implement manually.

Also, in the FA field, an application is used to perform data analysis such as failure prediction by periodically collecting data. This outputting of data analysis results such as this failure prediction may often take longer than the period for the data collection.

However, for example, in Patent Document 1, either the period or deadline of the computing process is set; therefore, it is not conceivable that the deadline is set longer than the period. Therefore, there may be a case where a deadline more than necessary is provided for the computing process that may be executed taking longer time than the period for data collection as in the above process.

The technique disclosed in the present specification is to solve the problems as described above, and an object of the present invention is to provide a technique for allocating computing processes to a plurality of computing nodes while taking the precedence constraints among a plurality of computing processes into consideration even when the deadline is longer than the period of the computing process.

Means to Solve the Problem

The first aspect of the technology disclosed in the present specification is a distributed allocation device connected, via a network, to a plurality of computing nodes to execute computing processes on data collected at a production line, and to allocate the computing processes to the plurality of computing nodes, the distributed allocation device, including an input unit to which a network architecture among the plurality of computing nodes, a name of computing process allocated to each of the computing nodes, an execution period during which each of the computing processes is executed, a deadline which is a required time from a start to an end of the plurality of computing processes, a precedence constraint defining an execution order among the plurality of computing processes, a data communication volume among the plurality of computing processes, and an execution time of each of the computing processes are input, a creation unit to create a constraint condition equation based on respective information input to the input unit, a derivation unit to derive an allocation and a schedule of the computing process for each of the computing nodes satisfying the constraint condition equation while referring to the network architecture among the plurality of computing nodes, and a distribution unit to distribute the allocation and the schedule of the computing process to each of the computing nodes. The creation unit determines an order to execute each of the computing processes based on the precedence constraint among the plurality of computing processes, and creates the constraint condition equation satisfying the deadline based on the execution time of each of the computing processes executed based on the order and the data communication volume among the plurality of computing processes. The creation unit calculates an entire period based on the execution period of each of the computing processes ordered based on the precedence constraints, and, if the deadline is longer than the entire period, creates the constraint condition equation which does not allocate an other computing process during execution of an excess computing process to the computing node to which the excess computing process which is executed past the entire period is allocated, in the subsequent entire period.

The second aspect of the technology disclosed in the present specification is a distributed allocation system, including a distributed allocation device connected, via a network, to a plurality of computing nodes to execute computing processes on data collected at a production line, and to allocate the computing processes to the plurality of computing nodes, and a network architecture connected to the distributed allocation device. The distributed allocation device includes an input unit to which a network architecture among the plurality of computing nodes, a name of computing process allocated to each of the computing nodes, an execution period during which each of the computing processes is executed, a deadline which is a required time from a start to an end of the plurality of computing processes, a precedence constraint defining an execution order among the plurality of computing processes, a data communication volume among the plurality of computing processes, and an execution time of each of the computing processes are input, a creation unit to create a constraint condition equation based on respective information input to the input unit, a derivation unit to derive an allocation and a schedule of the computing process for each of the computing nodes satisfying the constraint condition equation while referring to the network architecture among the plurality of computing nodes, and a distribution unit to distribute the allocation and the schedule of the computing process to each of the computing nodes. The creation unit determines an order to execute each of the computing processes based on the precedence constraint among the plurality of computing processes, and creates the constraint condition equation satisfying the deadline based on the execution time of each of the computing processes executed based on the order and the data communication volume among the plurality of computing processes. The creation unit calculates an entire period based on the execution period of each of the computing processes ordered based on the precedence constraints, and, if the deadline is longer than the entire period, creates the constraint condition equation which does not allocate an other computing process during execution of an excess computing process to the computing node to which the excess computing process which is executed past the entire period is allocated, in the subsequent entire period. The network architecture including the plurality of computing nodes to execute computing processes, and a network switch to connect between the plurality of computing nodes.

The third aspect of the technology disclosed in the present specification is a distributed allocation method in which the computing processes are allocated to a plurality of computing nodes configured to execute computing processes on data collected at a production line, and connected via a network, the method including the steps of inputting an input unit to which a network architecture among the plurality of computing nodes, a name of computing process allocated to each of the computing nodes, an execution period during which each of the computing processes is executed, a deadline which is a required time from a start to an end of the plurality of computing processes, a precedence constraint defining an execution order among the plurality of computing processes, a data communication volume among the plurality of computing processes, and an execution time of each of the computing processes, creating a constraint condition equation based on input respective information, and deriving an allocation and a schedule of the computing process for each of the computing nodes satisfying the constraint condition equation while referring to the network architecture among the plurality of computing nodes, distributing the allocation and the schedule of the computing process to each of the computing nodes. The constraint condition equation is created such that an order to execute each of the computing processes is determined based on the precedence constraint among the plurality of computing processes, and the deadline is satisfied based on the execution time of each of the computing processes executed based on the order and the data communication volume among the plurality of computing processes. The constraint condition equation is created such that an entire period is calculated based on the execution period of each of the computing processes ordered based on the precedence constraints, and, if the deadline is longer than the entire period, the other computing process is not allocated during execution of an excess computing process to the computing node to which the excess computing process which is executed past the entire period is allocated, in the subsequent entire period.

Effects of the Invention

The first aspect of the technology disclosed in the present specification is a distributed allocation device connected, via a network, to a plurality of computing nodes which execute computing processes on data collected at a production line, and to allocate the computing processes to the plurality of computing nodes, the distributed allocation device, including an input unit to which a network architecture among the plurality of computing nodes, a name of computing process allocated to each of the computing nodes, an execution period during which each of the computing processes is executed, a deadline which is a required time from a start to an end of the plurality of computing processes, a precedence constraint defining an execution order among the plurality of computing processes, a data communication volume among the plurality of computing processes, and an execution time of each of the computing processes are input, a creation unit to create a constraint condition equation based on respective information input to the input unit, a derivation unit to derive an allocation and a schedule of the computing process for each of the computing nodes satisfying the constraint condition equation while referring to the network architecture among the plurality of computing nodes, and a distribution unit to distribute the allocation and the schedule of the computing process to each of the computing nodes. The creation unit determines an order to execute each of the computing processes based on the precedence constraint among the plurality of computing processes, and creates the constraint condition equation satisfying the deadline based on the execution time of each of the computing processes executed based on the order and the data communication volume among the plurality of computing processes. The creation unit calculates an entire period based on the execution period of each of the computing processes ordered based on the precedence constraints, and, if the deadline is longer than the entire period, creates the constraint condition equation which does not allocate an other computing process during execution of an excess computing process to the computing node to which the excess computing process which is executed past the entire period is allocated, in the subsequent entire period. According to such a configuration, the constraint condition equation is created such that the order in which each computing process is executed is determined based on the precedence constraints among a plurality of computing processes, and a plurality of computing processes executed based on the order satisfy, as a whole, the deadline. Therefore, it is no need to set an appropriate deadline for each computing process. And, the constraint condition equation is created such that, even if the deadline is longer than the entire period of a plurality of computing processes ordered based on the precedence constraints, the other computing process during execution of an excess computing process is not allocated to the computing node to which the excess computing process is to be allocated, in the subsequent entire period. Therefore, the deadline is not set shorter than necessary in relation to the execution period.

The second aspect of the technology disclosed in the present specification is a distributed allocation system, including a distributed allocation device connected, via a network, to a plurality of computing nodes configured to execute computing processes on data collected at a production line, and configured to allocate the computing processes to the plurality of computing nodes, and a network architecture connected to the distributed allocation device. The distributed allocation device includes an input unit to which a network architecture among the plurality of computing nodes, a name of computing process allocated to each of the computing nodes, an execution period during which each of the computing processes is executed, a deadline which is a required time from a start to an end of the plurality of computing processes, a precedence constraint defining an execution order among the plurality of computing processes, a data communication volume among the plurality of computing processes, and an execution time of each of the computing processes are input, a creation unit configured to create a constraint condition equation based on respective information input to the input unit, a derivation unit to derive an allocation and a schedule of the computing process for each of the computing nodes satisfying the constraint condition equation while referring to the network architecture among the plurality of computing nodes, and a distribution unit to distribute the allocation and the schedule of the computing process to each of the computing nodes. The creation unit determines an order to execute each of the computing processes based on the precedence constraint among the plurality of computing processes, and creates the constraint condition equation satisfying the deadline based on the execution time of each of the computing processes executed based on the order and the data communication volume among the plurality of computing processes. The creation unit calculates an entire period based on the execution period of each of the computing processes ordered based on the precedence constraints, and, if the deadline is longer than the entire period, creates the constraint condition equation which does not allocate an other computing process during execution of an excess computing process to the computing node to which the excess computing process which is executed past the entire period is allocated, in the subsequent entire period. The network architecture including the plurality of computing nodes to execute computing processes, and a network switch to connect between the plurality of computing nodes. According to such a configuration, the constraint condition equation is created such that the order in which each computing process is executed is determined based on the precedence constraints among a plurality of computing processes, and a plurality of computing processes executed based on the order satisfy, as a whole, the deadline. Therefore, it is no need to set an appropriate deadline for each computing process. And, the constraint condition equation is created such that, even if the deadline is longer than the entire period of a plurality of computing processes ordered based on the precedence constraints, the other computing process during execution of an excess computing process is not allocated to the computing node to which the excess computing process is to be allocated, in the subsequent entire period. Therefore, the deadline is not set shorter than necessary in relation to the execution period.

The third aspect of the technology disclosed in the present specification is a distributed allocation method in which the computing processes are allocated to a plurality of computing nodes to execute computing processes on data collected at a production line, and connected via a network, the method including the steps of inputting an input unit to which a network architecture among the plurality of computing nodes, a name of computing process allocated to each of the computing nodes, an execution period during which each of the computing processes is executed, a deadline which is a required time from a start to an end of the plurality of computing processes, a precedence constraint defining an execution order among the plurality of computing processes, a data communication volume among the plurality of computing processes, and an execution time of each of the computing processes, creating a constraint condition equation based on input respective information, and deriving an allocation and a schedule of the computing process for each of the computing nodes satisfying the constraint condition equation while referring to the network architecture among the plurality of computing nodes, distributing the allocation and the schedule of the computing process to each of the computing nodes. The constraint condition equation is created such that an order to execute each of the computing processes is determined based on the precedence constraint among the plurality of computing processes, and the deadline is satisfied based on the execution time of each of the computing processes executed based on the order and the data communication volume among the plurality of computing processes. The constraint condition equation is created such that an entire period is calculated based on the execution period of each of the computing processes ordered based on the precedence constraints, and, if the deadline is longer than the entire period, the other computing process is not allocated during execution of an excess computing process to the computing node to which the excess computing process which is executed past the entire period is allocated, in the subsequent entire period. According to such a configuration, the constraint condition equation is created such that each computing process executed based on the precedence constraints satisfies the deadline as a whole. And, the constraint condition equation is created such that, even if the deadline is longer than the entire period of a plurality of computing processes, the other computing process during execution of an excess computing process is not allocated to the computing node to which the excess computing process is to be allocated, in the subsequent entire period. Therefore, it is no need to set an appropriate deadline for each computing process, and the deadline is not set shorter than necessary in relation to the execution period.

These and other objects, features, aspects and advantages of the present application will become more apparent from the following detailed description when taken in conjunction with the accompanying drawings.

BRIEF DESCRIPTION OF DRAWINGS

FIG. 7 A table illustrating a data communication volume among the computing processes according to the embodiment.

FIG. 8 A table illustrating execution times of the computing processes according to the embodiment.

FIG. 11 A table illustrating a shortest communication path in the network architecture illustrated in FIG. 4.

FIG. 14 A diagram in which the start time and the end time of a data communication between each computing process are added to the allocation result illustrated in FIG. 13 based on the precedence constraints.

DESCRIPTION OF EMBODIMENTS

Figure 1:
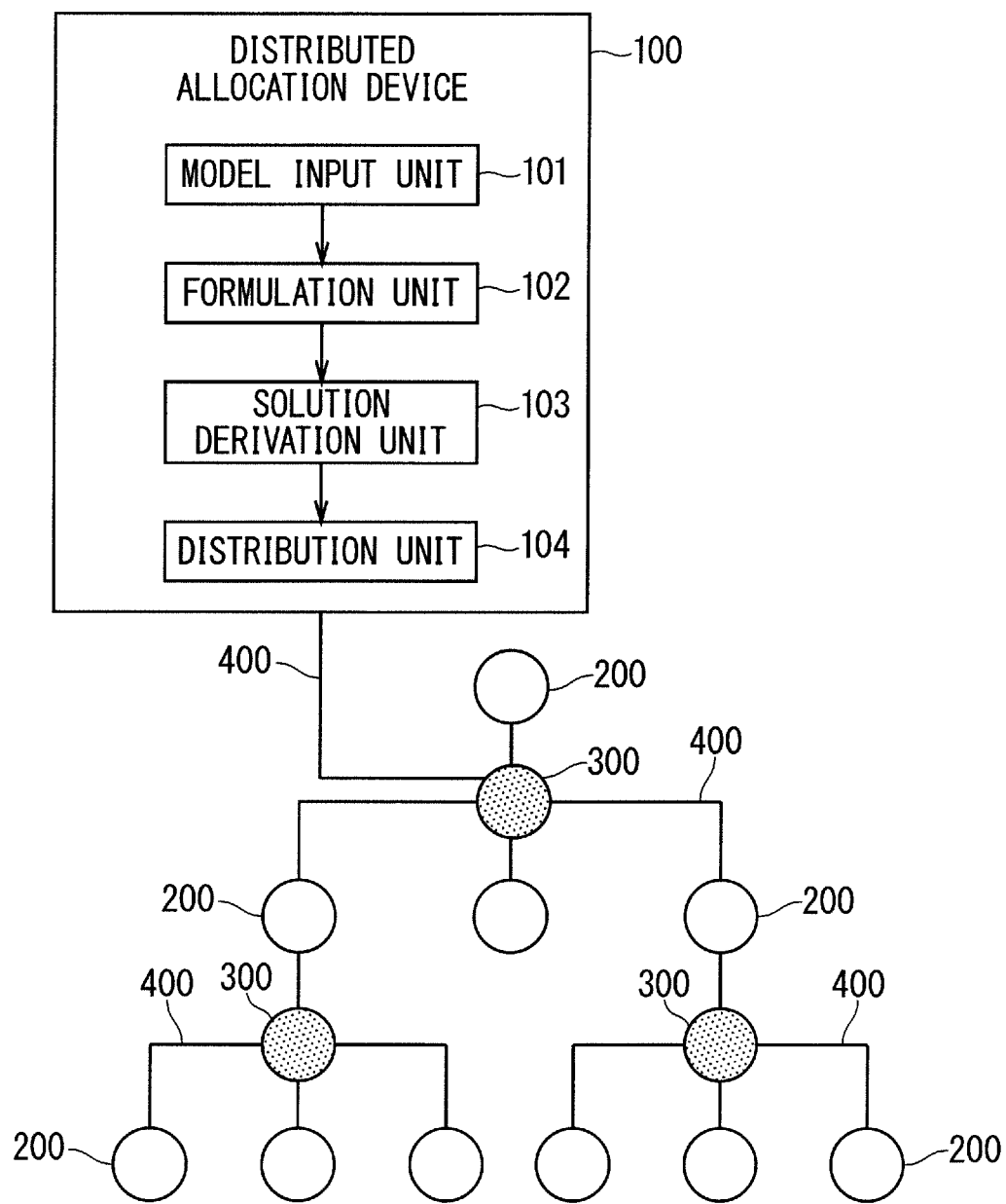
FIG. 1 A diagram functionally illustrating a configuration of a distributed allocation system according to an embodiment.

Hereinafter, embodiments are described with reference to the accompanying drawings.

It should be noted that the drawings are schematically illustrated and, therefore, the configuration is appropriately omitted or simplified for facilitating the description. Also, the mutual relationship among sizes and positions in configurations and the like illustrated in different drawings are not necessarily accurately described, and may be changed as appropriate.

In addition, in the following description, the same components are denoted by the same reference numerals, and the names and functions thereof are also similar. Accordingly, detailed descriptions thereof may be omitted to avoid redundancy.

First Embodiment

Hereinafter, a distributed allocation device, a distributed allocation system, and a distributed allocation method according to the first embodiment will be described.

Configuration of Distributed Allocation Device

FIG. 1 is a diagram functionally illustrating a configuration of the distributed allocation system according to the first embodiment. As illustrated in FIG. 1, the distributed allocation device 100 in the distributed allocation system is connected to a plurality of computing nodes 200 and a plurality of network switches 300 via the communication paths 400. Here, the computing nodes 200 mainly execute computing processes on data collected in a production line. Also, the distributed allocation device 100 includes a model input unit 101, a formulation unit 102, a solution derivation unit 103, and a distribution unit 104.

The network switches 300 are connected to the distributed allocation device 100, the computing nodes 200 and other network switches 300 via the communication paths 400. And the network switches 300 also include a means for relaying data and transferring data.

The model input unit 101 includes a means for a user to input a model description including the network architecture of the computing nodes 200 and the computing processes to be executed in the computing nodes 200.

The formulation unit 102 includes a means for performing formulation from the model description input to the model input unit 101 into a constraint condition equation, specifically, creating a constraint condition equation.

The solution derivation unit 103 includes means for deriving an allocation of the computing processes each of which satisfying the constraint condition equation to the computing nodes 200 and a schedule indicating the timing at which each computing process is performed as a solution, while referring to the network architecture among a plurality of computing nodes 200.

The solution derivation unit 103 includes a means for selecting an optimal solution from a plurality of derived solutions using an objective function specified by the user. If there is one derived solution, the solution derivation unit 103 selects the solution as an optimal solution.

The distribution unit 104 includes a means for distributing the allocation of the computing processes and the schedules derived by the solution derivation unit 103 to the computing nodes 200.

Figure 2:
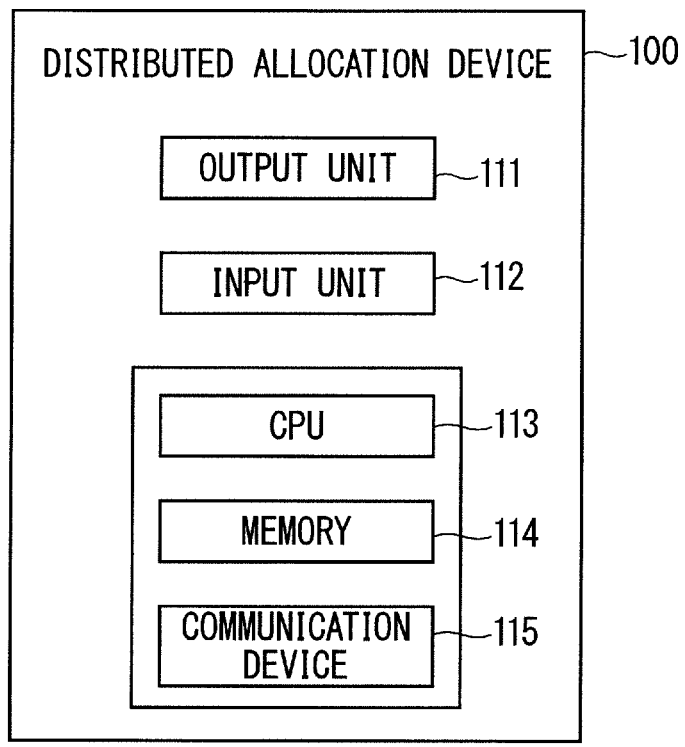
FIG. 2 A diagram schematically illustrating an internal configuration of a distributed allocation device according to the embodiment.

FIG. 2 is a diagram schematically illustrating an internal configuration of the distributed allocation device 100. As illustrated in FIG. 2, the distributed allocation device 100 includes an output unit 111, an input unit 112, a central processing unit (CPU) 113, a memory 114, and a communication device 115.

The output unit 111 displays the allocation of computing processes and the schedule result that satisfy the constraint condition equation based on a model description input by a user. The input unit 112 includes a means for the user to input the model description.

The CPU 113 executes formulation of the model description to the constraint condition equation, and performs the allocation of the computing processes satisfying the constraint condition equation to the computing nodes 200 and execution of scheduling. Further, the CPU 113 selects an optimal solution from the derived solutions using an objective function specified by the user.

The memory 114 stores an execution program of the distributed allocation device 100. The communication device 115 distributes the allocation of computing processes and the schedules to the computing nodes 200.

Figure 3:
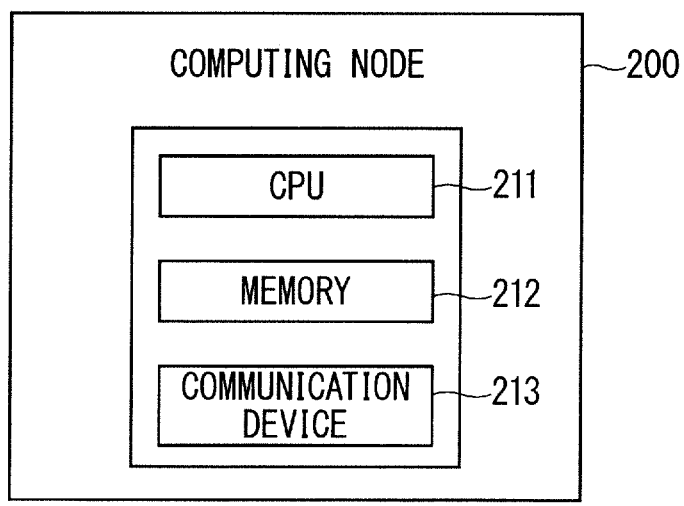
FIG. 3 A diagram schematically illustrating an internal configuration of a computing node according to the embodiment.

FIG. 3 is a diagram schematically illustrating an internal configuration of the computing node 200. As illustrated in FIG. 3, the computing node 200 includes a CPU 211, a memory 212, and a communication device 213.

The CPU 211 executes the computing process distributed from the distributed allocation device 100. The memory 212 stores the computing process and the schedule distributed from the distributed allocation device 100. The communication device 213 transmits data generated as a result of computing process to another computing node 200 connected via a network.

Next, each functional unit of the distributed allocation device 100 will be described in detail.

First, the model input unit 101 will be described.

The model input unit 101 includes a means for inputting a network architecture indicating a relationship among the computing nodes 200, the network switches 300, and the communication paths 400, a transmission speed TS in the communication paths 400, a name of a computing process allocated to each of the computing nodes 200, precedence constraints defining an execution order among the plurality of computing processes, an execution period during which each of the computing processes is executed, a deadline which is a required time from a start to an end of the plurality of computing processes, a data communication volume among a plurality of computing processes, and an execution time of each of the computing processes. Here, the model input unit 101 may also receive the content of the computing processes, for example, a program that describes the processing operation.

Figure 4:
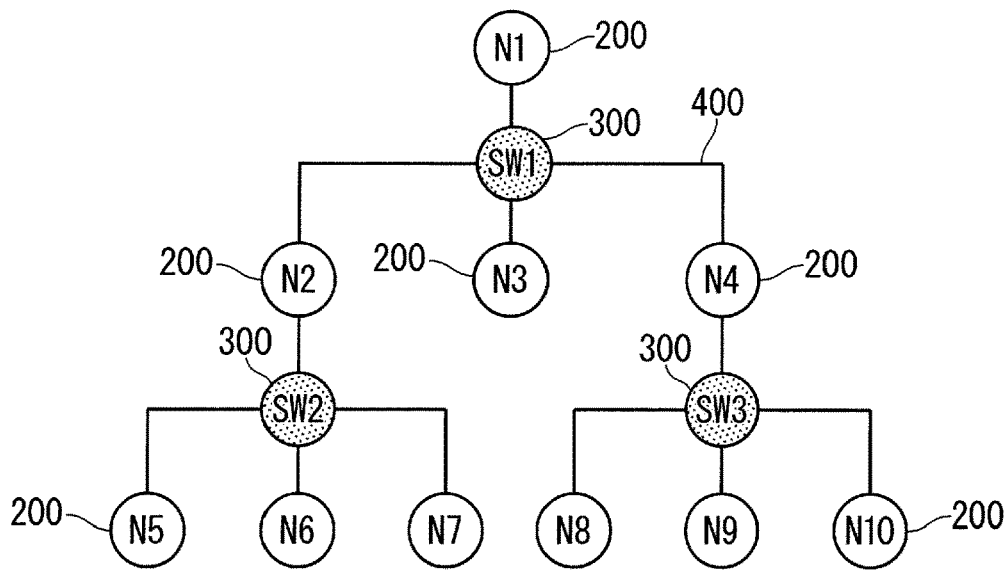
FIG. 4 A diagram illustrating a network architecture showing a relationship among computing nodes, network switches, and communication paths according to the embodiment.
Figure 5:
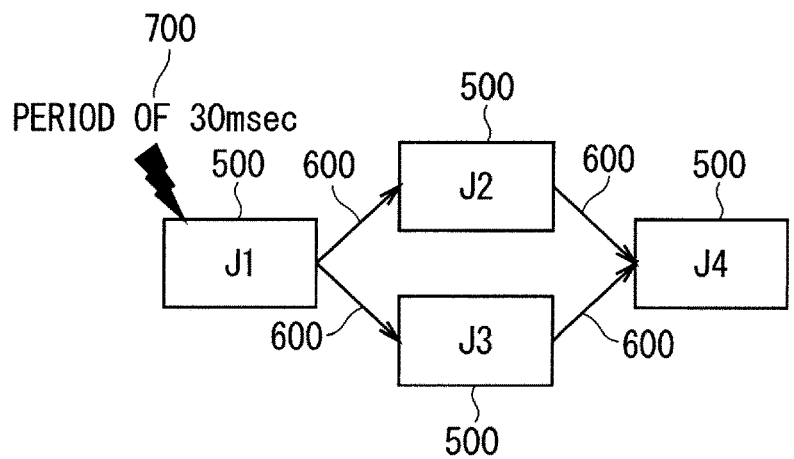
FIG. 5 A diagram illustrating a model description regarding preceding constraints among computing processes according to the embodiment.

FIG. 4 is a diagram illustrating the network architecture showing a relationship among the computing nodes 200, the network switches 300, and the communication paths 400. FIG. 5 is a diagram illustrating the model description regarding preceding constraints 600 of a computing process 500 and among the computing processes 500.

Figure 6:
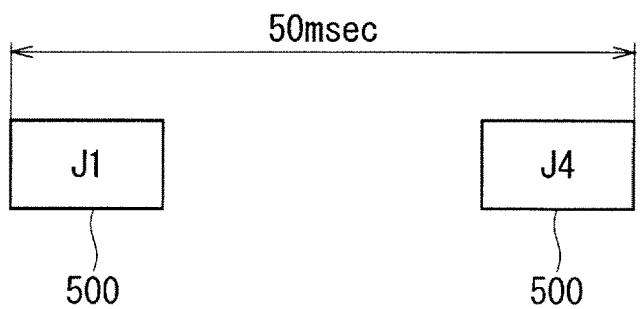
FIG. 6 A diagram conceptually illustrating a deadline of a plurality of computing processes according to the embodiment.

FIG. 6 is a diagram conceptually illustrating a deadline of a plurality of computing processes 500. FIG. 7 is a table illustrating a data communication volume among the computing processes 500. FIG. 8 is a table illustrating execution times of the computing processes 500.

Next, the details of the model description input to the model input unit 101 will be described.

In FIG. 5, for example, it is described by the execution period 700 that describes that a computing process J1 of the computation processes 500 is periodically executed at 30 msec.

Also, the precedence constraint 600 between the computing process J1 and the computing process J2 among the computing processes 500 describes that the computing process J2 is to start after a computing node 200 to which the computing process J2 is allocated completes the reception of data generated after completion of the computing process J1.

Further, in FIG. 7, the data volume transmitted from the computing node 200 to which the computing process J1 is allocated to the computing node 200 to which the computing process J2 is allocated is described as "50 Mbyte" in the line "J1→J2".

Further, in FIG. 8, the names of the computation nodes 200 to which the computation processes 500 can be allocated, and the execution times of the computation processes in the computation nodes 200 are described.

In FIG. 8, the names of the computing process are described in the top row, and the computing node names are described in the leftmost column. And, "-" is described for the computing nodes 200 to which the computing processes 500 cannot be allocated, and the execution times of the computing processes are described in the computing nodes 200 to which the computing processes 500 can be allocated. The "execution time of computing process" is described in the minimum unit set by the distributed allocation device. However, when the execution times of the computing processes 500 actually have a variation, the longest execution time of the varied execution times is described. Here, the names of the computing processes are names for identifying the content of the computing processes, and are indicated by, for example, numbers or symbols.

The execution times for the computing processes 500 may be specified by, before model input to the distributed allocation device 100, measuring the execution times after arranging computing processes 500 in each computing node 200 in advance, or estimating the execution times from a computing process program. Alternatively, the distributed allocation device 100 may automatically measure the execution times of the computing processes 500.

Next, the formulation unit 102 will be described.

The formulation unit 102 derives a constraint condition equation from the model description input to the model input unit 101.

The constraint condition equation is an equation that uses the computing node 200 to which each computing process 500 is allocated and the execution start time of each operation process 500 as input parameters, and determines whether the constraint is satisfied or not.

Hereinafter, the input parameters of the constraint condition equation are represented as follows.

$Jx\_N$: allocated computing node for computing process Jx (N1, N, . . . N10)

$Jx\_S$: start time of computing process Jx

In the constraint condition equation, the following are used as parameters that becomes clear from the model description and the input parameters.

TS: transmission speed in communication path $Jx\_E$: end time of computing process Jx $Jx\_to\_Jy\_S$: data transmission start time from computing process Jx to computing process Jy $Jx\_to\_Jy\_E$: data transmission end time from computing process Jx to computing process Jy P: entire period Here, the transmission speed TS is a parameter directly described in the model description. The end time $Jx\_E$ is a parameter derived from the input parameters of the computing node $Jx\_N$ and the start time $Jx\_S$ based on FIG. 8.

Also, the data transmission start time $Jx\_to\_Jy\_S$ is the same as the end time $Jx\_E$. And, since the data transmission end time $Jx\_to\_Jy\_E$ may be earlier than the start time $Jy\_S$, the data transmission end time $Jx\_to\_Jy\_E$ is the same as the start time $Jy\_S$.

When there is only one computing process 500 that is periodically executed, or when a plurality of computing processes 500 having the same period are periodically executed, the entire period P indicates the execution period of the computing process. The case where there are two or more types of computing processes 500 periodically executed will be described in the second embodiment described later.

In the model description of the computing processes 500 of FIG. 5, since the computing process 500 periodically executed is one, the computing process J1, the entire period P is 30 msec.

The constraint condition equation is an equation that determines whether all the precedence constraint, constraints for computing nodes which can receive allocations and their execution times, computing node resource constraints, communication path resource constraints, and deadline constraints are satisfied.

Hereinafter, the constraint condition equation derived from all the constraints is referred to as an all constraint condition equation, and the constraint condition equation derived from each constraint is simply referred to as a constraint condition equation.

Next, a constraint condition equation derived from the precedence constraint 600 will be described.

The constraint condition equations regarding the precedence constraints 600 are a constraint condition equation in which the start time of the periodically executed computing process 500 is 0, and a constraint condition equation regarding the execution order of the two computing processes 500 in which the precedence constraint 600 is described in between. In the precedence constraints 600 illustrated in FIG. 5, since there is no computing process preceding the computing process J1, the start time J1_S of the computing process J1 is set to 0. Accordingly, an equation in which the start time Jx_S of the computing process Jx periodically executed is 0 is referred to as <Constraint condition equation 1>.

$$Jx\_S = 0 \qquad \text{<Constraint condition equation 1>}$$

Further, since a precedence constraint is described between the computing process J1 and computing process J2, the constraint condition equation between two computing processes 500 is as follows.

$$J1\_E = J1\_to\_J2\_S \qquad \text{(Equation 2-1)}$$

$$J1\_to\_J2\_S \leq J1\_to\_J2\_E \qquad \text{(Equation 2-2)}$$

$$J1\_to\_J2\_E \leq J2\_S \qquad \text{(Equation 2-3)}$$

$$J2\_S \leq J2\_E \qquad \text{(Equation 2-3)}$$

The above (Equation 2-1), (Equation 2-2), (Equation 2-3) and (Equation 2-4) are similarly generated for the computing process J1 and the computing process J3, the computing process J2 and the computing process J4, and the computing process J3 and computing process J4. And all these equations connected with the logical product AND be a constraint condition equation of a precedence constraint, and set as <Constraint condition equation 2>.

$$\text{(Equation 2-1)AND(Equation 2-2)AND} \ldots \qquad \text{<Constraint condition equation 2>}$$

Next, a constraint condition equation derived from the computing nodes 200 which can receive allocations and constraints on execution times will be described.

Based on the computing node 200 to which the computing process 500 is allocated, a constraint condition equation for determining the execution time of the computing process 500 is derived.

Assuming that the execution time when the computing process Jx is allocated to the computing node Ny is Txy, the following constraint condition equation is obtained.

$$(Jx\_N = Ny)\text{AND}((Jx\_E - Jx\_S) = Txy) \qquad \text{(Equation 3-1)}$$

Here, when, for the computing node Jx_N, the computing nodes 200 which can receive allocations are set as the computing node N1, the computing node N2, and the computing node N3, since (Equation 3-1) only needs to satisfy the constraint condition equation with any of the computing node N1, the computing node N2, and the computing node N3, the connection is made by the logical sum OR.

The execution time when the computing process Jx is allocated to the computing node N1 is Tx1, the execution time when the computing process Jx is allocated to the computing node N2 is Tx2, and the execution time when the computing process Jx is allocated to the computing node N3 is Tx3, the following constraint condition equation is obtained.

$$((Jx\_N = N1)\text{AND}((Jx\_E - Jx\_S) = Tx1))$$

OR $$((Jx\_N = N2)\text{AND}((Jx\_E - Jx\_S) = Tx2))$$

OR $$((Jx\_N = N3)\text{AND}((Jx\_E - Jx\_S) = Tx3)) \qquad \text{(Equation 3-2)}$$

The above constraint condition equation is derived for a plurality of computing processes 500, and a combination thereof with the logical product AND is set as a constraint condition equation of the computing nodes 200 to which the computing processes 500 are allocated, as <Constraint condition equation 3>.

In FIG. 8, <Constraint condition equation 3> is as follows.

<Constraint condition equation 3>

$$((J1\_N = N5)\text{AND}((J1\_E - J1\_S) = 10))$$

AND $$(((J2\_N = N1)\text{AND}((J2\_E - J2\_S) = 5))\text{OR}$$
$$((J2\_N = N2)\text{AND}(J2\_E - J2\_S) = 10))\text{OR}$$

...

$$((J2\_N = N10)\text{AND}((J2\_E - J2\_S) = 30)))$$

AND $$(((J3\_N = N1)\text{AND}((J3\_E - J3\_S) = 5))\text{OR}$$
$$((J3\_N = N2)\text{AND}((J3\_E - J3\_S) = 10))\text{OR}$$

...

$$((J3\_N = N10)\text{AND}((J3\_E - J3\_S) = 30)))$$

AND $$((J4\_N = N4)\text{AND}(J4\_E - J4\_S) = 5)).$$

Next, a constraint condition equation derived from the resource constraint of the computing node 200 will be described.

The resource constraint of the computing node 200 is whether or not the computing nodes 200 which can receive allocations are different between the two computing processes 500, and when two computing processes 500 are allocated to the same computing node 200, the execution times are constrained not to overlap each other.

The resource constraint of the computing node 200 between the computing process Jx and the computing process Jy is as follows.

$$(Jx\_N \neq Jy\_N)\text{OR}((Jx\_S \geq Jy\_E)\text{OR}(Jy\_S \geq Jx\_E))$$

The (Equation 4-1) described above is derived for all the combinations of the computing processes 500 and connected with the logical product AND is a constraint condition equation for the resource constraint of the computing node 200.

Here, in the present embodiment, a constraint condition equation including the case where the execution of the computing processes 500 exceeds the entire period P is derived. Therefore, it is required to determine that the computing process that exceeds the entire period P, that is, the excess computing process does not violate the computing process and the resource constraint in the next entire period P.

Figure 9:
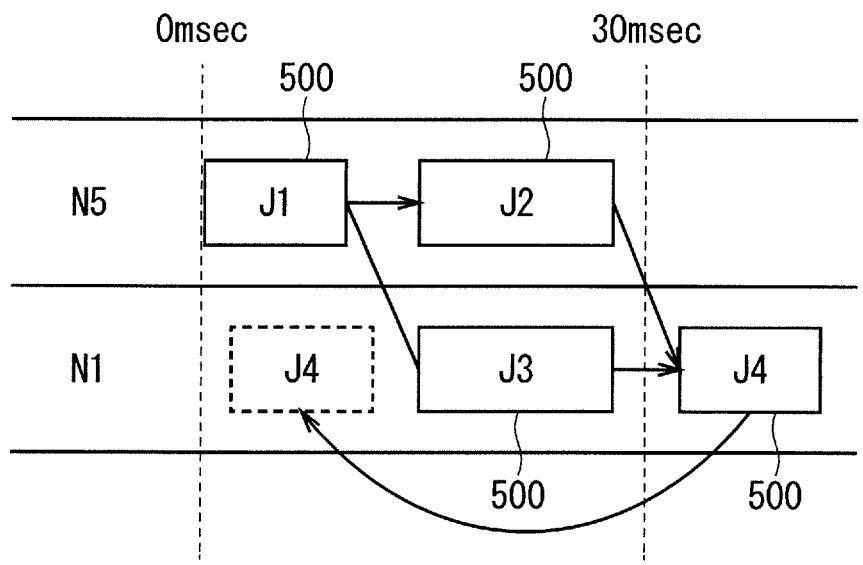
FIG. 9 A diagram illustrating a schedule, when the computing processes are allocated to the computing nodes according to the embodiment.

FIG. 9 is a diagram illustrating a schedule when the computing process J1 and computing process J2 are allocated to the computing node N5, and the computing process J3 and the computing process J4 are allocated to the computing node N1.

Since the execution period of the computing process J1 is 30 msec and the computing process 500 periodically executed is one of the computing process J1, the entire period P is 30 msec. Here, the deadline from the start of the computing process J1 to the end of the computing process J4 is 50 msec as illustrated in FIG. 6.

From the resource constraint of the computing node 200, the computing process J3 is not executed in the computing node N1 in the time zone in which a time zone between the start time (J4_S) of the computing process J4 and the end time (J4_E) of the computing process J4 is shifted ahead by one period, in the entire period P. Specifically, for the computing node N1 to which the computing process J4 is allocated, which is the excess computing process executed exceeding the entire period P, the other computing process, such as the computing process J3, is not to be allocated during the execution of the computing process J4, in the subsequent entire period P.

The resource constraint of the computing node 200 for such a computing process 500 exceeding the entire period P is as follows.

$$(Jx\_N \neq Jy\_N) \text{OR}((Jx\_S \geq Jy\_E+P) \text{OR}(Jy\_S \geq Jx\_E+P)) \quad \text{(Equation 4-2)}$$

These (Equation 4-1) and (Equation 4-2) connected with the logical product AND be a constraint condition equation of a resource constraint of the computing node, and set as <Constraint condition equation 4>

Next, a constraint condition equation derived from the resource constraint of the communication path 400 will be described.

The communication path 400 is capable of executing data transmission from a plurality of computing processes 500 simultaneously on one communication path 400. The transmission speed TS in the communication path 400 is equally divided by the number of computing processes 500 executing data transmission simultaneously. Further, when the transmission source and the transmission destination are the same computing node 200, communication does not occur, and there is no resource restriction of the communication path 400.

The simultaneous transmission of data by a plurality of computing processes 500 on one communication path 400 is called a conflict of the communication path 400. In order to determine the conflict of the communication path 400, first, the shortest communication path between the two computing nodes 200 is derived.

The shortest communication path is a path in which the sum of the number of computing nodes 200 and the number of network switches 300 passing through in the communication path 400 from the source computing node 200 to the destination computing node 200 is the smallest.

Figure 10:
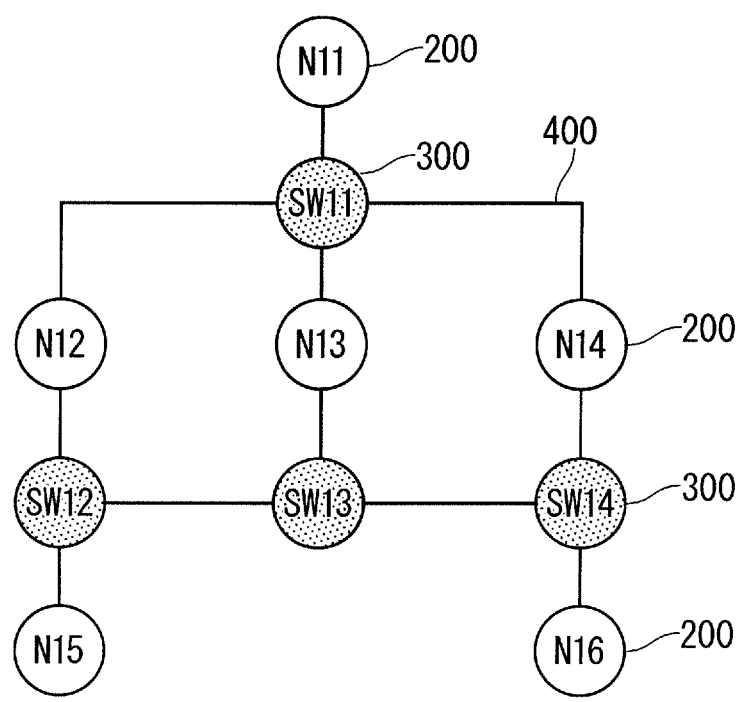
FIG. 10 A diagram illustrating a network architecture showing a relationship among computing nodes, network switches, and communication paths according to the embodiment.

FIG. 10 is a diagram illustrating the network architecture showing a relationship among the computing nodes 200, the network switches 300, and the communication paths 400. In the network architecture illustrated in FIG. 10, there are a plurality of paths as exemplified below as candidate paths from the computing node N11 to the computing node N15.

N11-SW11-N12-SW12-N15
(Path 1)
N11-SW11-N13-SW13-SW12-N15
(Path 2)
N11-SW11-N14-SW14-SW13-SW12-N15
(Path 3)

In the above, the path 1 is the shortest communication path. The shortest communication path is calculated from the model description input by the user, and a table of the shortest communication path between the two computing nodes 200 is generated.

FIG. 11 is a table illustrating the shortest communication path in the network architecture illustrated in FIG. 4. In FIG. 11, when the transmission source and the transmission destination are the same computing node 200, the shortest path is described as "-". The conflict of the communication path 400 is determined using FIG. 11.

The determination of the conflict of communication path 400 for data transmission from the computing node Nx1 to the computing node Ny1 and data transmission from the computing node Nx2 to the computing node Ny2 will be described.

In the shortest communication path from the computing node Nx1 to the computing node Ny1 and the shortest communication path from the computing node Nx2 to the computing node Ny2, if the same communication path 400 is included therein, it is determined that there is a conflict, and if the same communication path 400 is not included therein, it is determined that there is no conflict.

In FIG. 11, the communication path from the computing node N1 to the computing node N10 and the communication path from the computing node N2 to the computing node N10 include both (SW1→N4), (N4→SW3) and (SW3→N10). Therefore, the communication paths are determined to be in conflict with each other.

Next, a constraint condition equation in the case where a conflict of the communication path occurs will be described.

The start time and the end time of all the computing processes 500 are extracted respectively, and T1, T2, T3, . . . are set in the order of the oldest time. The conflict of the communication path 400 is detected within each time interval of T1 to T2, T2 to T3, T3 to T4, . . . , and the transmission speed is equally divided by the number of data communications in which the conflict occurs.

Figure 12:
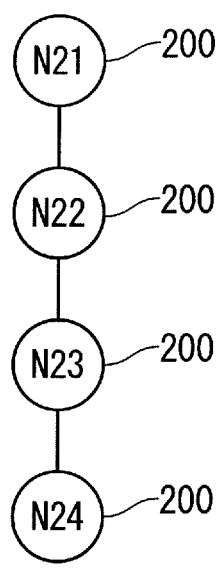
FIG. 12 A diagram illustrating a network architecture according to the embodiment.

FIG. 12 is a diagram illustrating a network architecture. And FIG. 13 is a diagram illustrating a result of allocating the computing processes 500 illustrated in FIG. 5 to the network architecture illustrated in FIG. 12.

Figure 13:
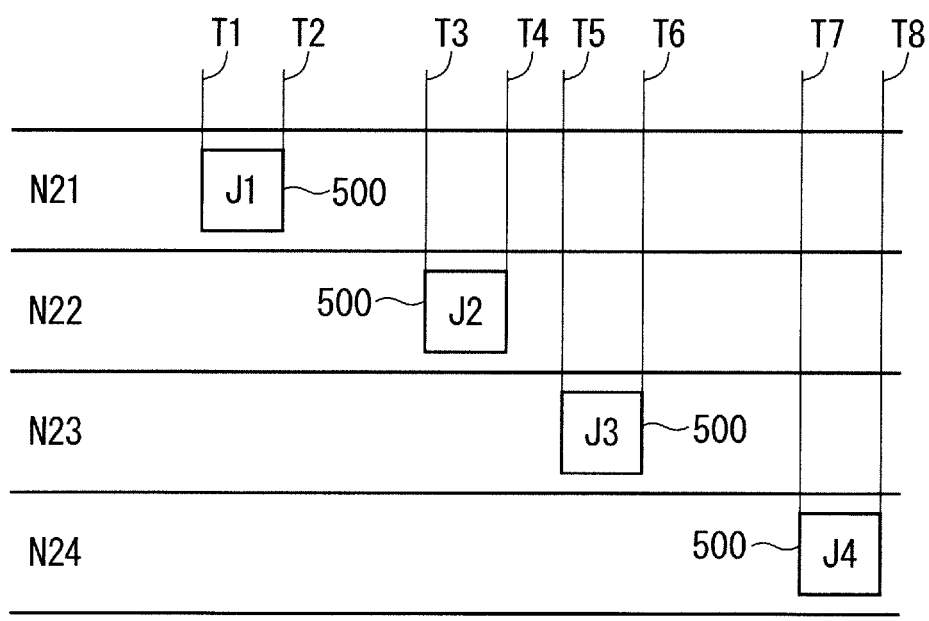
FIG. 13 A diagram illustrating a result of allocating the computing processes illustrated in FIG. 5 to the network architecture illustrated in FIG. 12.

In FIG. 13, the start time and the end time of each computing process 500 are indicated by T1, T2, T3, . . . , and T8.

FIG. 14 is a diagram in which the start times and the end times of data communications between respective computing processes 500 are added to the allocation result illustrated in FIG. 13 based on the precedence constraints 600. In FIG. 14, data transmission from the computing process J1 to the computing process J2 is required to be completed within the range of "J1→J2". This constraint is taken as the resource constraint of the communication path.

Assuming that data transmission from the computing process Jx to the computing process Jy occurs, and the end time Jx_E=Tn and the start time Jy_S=Tm, the following constraint condition equation is obtained.

⟨Resource constraint of communication path⟩

(data communication volume of $Jx \to Jy$) ≤
$(Tn+1-Tn) \times TS/$
  (the number of conflicts between $Tn$ and $Tn+1$) +
$(Tn+2-Tn+1) \times TS/$
  (the number of conflicts between $Tn+1$ and $Tn+2$) +
$(Tn+3-Tn+2) \times TS/$
  (the number of conflicts between $Tn+2$ and $Tn+3$)
  ... $(Tm-Tm-1) \times TS/$
  (the number of conflicts between $Tm$ and $Tm-1$)

The above equation is generated for all the computing processes 500 in which data transmission occurs, and connected with the logical product AND is set as ⟨Constraint condition equation 5⟩.

In FIG. 14, ⟨Constraint condition equation 5⟩ is as follows.

⟨Constraint condition equation 5⟩

(data communication volume of $J1 \to J2$) ≤
$(T3-T2) \times TS/2$)
AND
((data communication volume of $J1 \to J3$) ≤
$(T3-T2) \times TS/2 +$
$(T4-T3) \times TS +$
$(T5-T4) \times TS/2$)
AND
((data communication volume of $J2 \to J4$) ≤
$(T5-T4) \times TS/2 +$
$(T6-T5) \times TS +$
$(T7-T6) \times TS/2$)
AND
((data communication volume of $J3 \to J4$) ≤
$(T7-T6) \times TS/2$)

Next, a constraint condition equation derived from the deadline will be described.

For the start time $Jx\_S$ of the computing process Jx and the end time $Jy\_E$ of the computing process Jy, from the constraint that the start time $Jx\_S$ to the end time $Jy\_E$ needs to be below a deadline DL, the following ⟨Constraint condition equation 6⟩ is derived.

$Jx\_S+DL \geq Jy\_E$     ⟨Constraint condition equation 6⟩

The model description of the deadline illustrated in FIG. 6 indicates the constraint that the deadline from the start time of the computing process J1 to the end time of the computing process J4 is required to be 50 msec or less, after taking the execution time of each computing process 500 and data communications between computing processes 500 or the like, into consideration.

From this constraint, the following the constraint condition equation below is derived.

$Jx\_S+50 \geq J4\_E$

It is necessary to satisfy all of ⟨Constraint condition equation 1⟩, ⟨Constraint condition equation 2⟩, ⟨Constraint condition equation 3⟩, ⟨Constraint condition equation 4⟩, ⟨Constraint condition equation 5⟩ and ⟨Constraint condition equation 6⟩ described so far; therefore, all the equations are connected with the logical product AND, and the equation is set as ⟨All constraint condition equation⟩.

⟨All constraint condition equation⟩=⟨Constraint condition equation 1⟩AND⟨Constraint condition equation 2⟩AND ... AND⟨Constraint condition equation 6⟩

Next, details of the solution derivation unit 103 will be described.

The solution derivation unit 103 derives input parameters that satisfy a constraint condition using all constraint condition equation derived by the formulation unit 102. Among the input parameters, the possible range of the computing node $Jx\_N$ to which the computing process Jx is allocated, that is, the computing node $Jx\_N$ to which the computing process Jx can be allocated, is illustrated in FIG. 8.

Among the input parameters, the minimum value of the start time $Jx\_S$ is 0, and the maximum value is (entire period P+maximum DL). Here, the maximum DL is the largest value of the deadlines input in the model description. The minimum unit of the start time $Jx\_S$ is set in the model input unit 101 in advance.

The solution derivation unit 103 inputs a combination of the range of possible values of the computing node $Jx\_N$ and the range of possible values of the start time $Jx\_S$ as an input parameter into the all constraint condition equation, and determines whether or not the constraint is satisfied. The input parameter that satisfies the constraint is called a solution.

At this point, the solution derivation unit 103 may exhaustively search for and derive a solution, or may derive a solution by local search.

Then, if no solution is found, the solution derivation unit 103 notifies the user. The notification that the solution cannot be found notifies the user that it is required that the number of computing nodes 200 is increased or the computing processes 500 are reduced, or the like.

When there are a plurality of above solutions, the solution derivation unit 103 uses the objective function O to select an optimal solution. It should be noted that, if there is one derived solution, the solution derivation unit 103 selects the solution as an optimal solution.

The user inputs the objective function O from the input unit 112 in FIG. 2. And, the solution derivation unit 103 selects whether which of the solutions maximizing or minimizing the objective function O is to be the optimal solution. For example, the objective function O for minimizing the entire processing time is as follows.

$O=MAX(J1\_E, J2\_E, J3\_E, ...)$

In the above equation, the MAX function is a function that returns the largest value among the arguments. The objective function O in the case of using the above equation is the end time of the computing process to be finally executed in all the computing processes.

The solution that minimizes the objective function O is the solution that minimizes the entire processing end time. For the objective function O, an objective function that minimizes the communication volume between the specific computing nodes may be set.

Next, details of the distribution unit 104 will be described. The distribution unit 104 distributes a computing node 200 to which a computing process 500 which is a solution derived in the solution derivation unit 103 is allocated, a start time of the allocated computing process 500, and an execution program of the computing process 500 to the respective computing nodes 200. The distribution unit 104 performs time synchronization with all the computing nodes 200, and notifies the respective computing nodes 200 of the leading time of the entire period P. Here, the execution program which is the content of the computing process 500 may refer to the one input to the model input unit 101 or may refer to the corresponding execution program stored in an external storage medium.

The computing node 200 stores the distributed start time of the computing process 500 and the execution program of the computing process 500 in the memory 212. And, based on the actual time, the computing node 200 calculates a time within the entire period P where the start of the entire period P is the time 0, and executes the computing process 500.

The time in the entire period P is calculated by the following equation.

(time within entire period $P$)=((actual time)−(start time of entire period $P$))%(entire period $P$)

Here, "%" in the above equation is an operator that obtains the value of the remainder obtained by dividing the left term by the right term.

Second Embodiment

Hereinafter, a distributed allocation device, a distributed allocation system, and a distributed allocation method according to the second embodiment will be described. In the following description, the same components in the above-described embodiment are illustrated in the drawings with the same reference numerals, and detailed description thereof is appropriately omitted.

Configuration of Distributed Allocation Device

In the distributed allocation device 100 according to the first embodiment, the execution period of the computing process 500 input to the model input unit 101 is one type. However, the execution periods of different lengths may be set for a plurality of computing processes 500.

Figure 15:
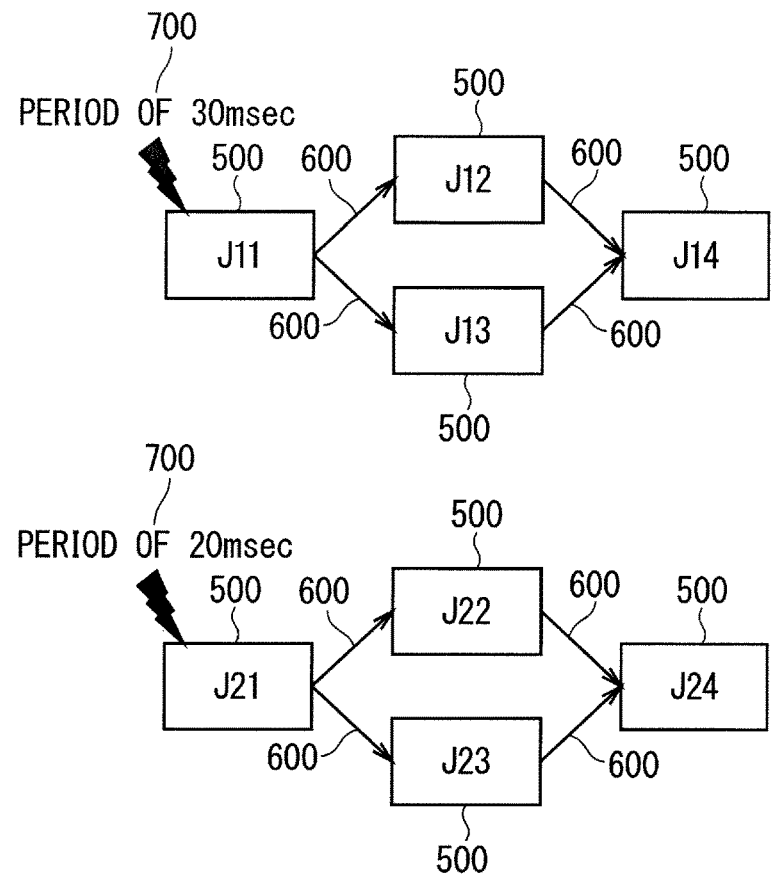
FIG. 15 A diagram illustrating model descriptions regarding the computing process executed in a period of 30 msec, the computing process executed in a period of 20 msec, and the preceding constraints among computing processes.

FIG. 15 is a diagram illustrating model descriptions regarding preceding constraints 600 among computing processes 500 for the computing process J11 executed in a period of 30 msec and the computing process J21 executed in a period of 20 msec.

Figure 16:
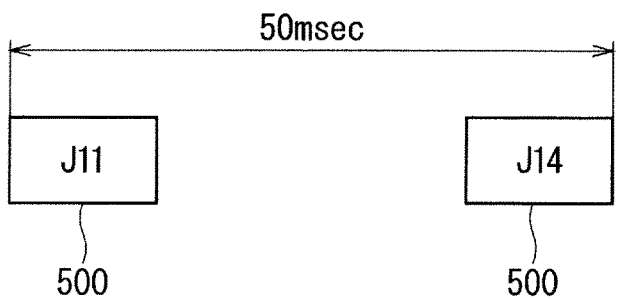
FIG. 16 A diagram conceptually illustrating a deadline of the computing processes corresponding to the model descriptions illustrated in FIG. 15.
Figure 17:
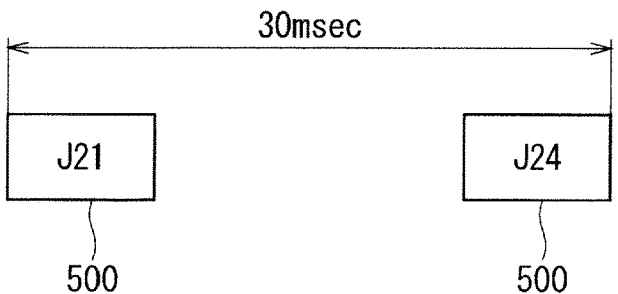
FIG. 17 A diagram conceptually illustrating a deadline of the computing processes corresponding to the model descriptions illustrated in FIG. 15.

FIG. 16 and FIG. 17 are diagrams conceptually illustrating deadlines of the computing processes 500 corresponding to the model descriptions illustrated in FIG. 15.

For computing processes 500 having a plurality of different periods, the entire period P is the least common multiple of each period. In FIG. 15, the entire period P is 60 msec, which is the least common multiple of 30 msec and 20 msec.

In the entire period P, the computing process J11 is executed twice, and the computing process J21 is executed three times. And, in the entire period P, the computing process J11 to be executed first is described as J11 [1], and the computing process J11 to be executed second is described as J11 [2]. The same applies to the computing process J21. A plurality of processes are similarly performed in the entire period P for all the computing processes related by the precedence constraints 600 from the computing process J11 and the computing process J21, and the computing process Jx [n] is similarly executed.

Here, the start time of the computing process Jx which is periodically executed is referred to as ⟨Constraint condition equation 1⟩.

⟨Constraint condition equation 1⟩

($Jx[1] = 0$)
AND($Jx[2]$ = (period of $Jx$) × 1)
AND($Jx[3]$ = (period of $Jx$) × 2)
...
AND($Jx[n]$ = (period of $Jx$) × ($n − 1$))

Although, Jx [1] is 0 here, it may be arbitrarily set in the range from 0 to less than (the period of the computing process Jx).

Constraint condition equation 1 above is as follows in the case of FIG. 15.
J11[1]_S=0
AND J11[2]_S=30
AND J21[1]_S=0
AND J21[2]_S=20
AND J21[3]_S=40

The all constraint condition equation is derived with ⟨Constraint condition equation 1⟩ derived in this manner and what derived ⟨Constraint condition equation 2⟩, ⟨Constraint condition equation 3⟩, ⟨Constraint condition equation 4⟩, ⟨Constraint condition equation 5⟩ and ⟨Constraint condition equation 6⟩ in the same manner as in the first embodiment for all computing processes with [n]. The operation of the solution derivation unit 103 and the operation of the distribution unit 104 are the same as in the first embodiment.

Effects of Above-Described Embodiments

Next, effects of the above-described embodiments will be exemplified. In the following description, although the effects are described based on the specific configurations exemplified in the embodiments described above, other specific configurations exemplified in the present specification may substitute therefor as long as the same effect is produced.

Also, the substitution may be implemented across a plurality of embodiments. That is, each of the configurations exemplified in the corresponding embodiments may be combined one another to produce the similar effects.

According to the embodiments described above, the distributed allocation device 100 is connected to a plurality of computing nodes 200 via the network, and allocates the computing processes 500 to a plurality of computing nodes 200. Here, the computing nodes 200 execute computing processes 500 on data collected in a production line. The distributed allocation device 100 includes an input unit, a creation unit, a derivation unit, and a distribution unit 104. Here, the input unit corresponds to, for example, the model input unit 101. Also, the creation unit corresponds to, for example, the formulation unit 102. Also, the derivation unit corresponds to, for example, the solution derivation unit 103. And, to the model input unit 101, a network architecture among a plurality of computing nodes 200, a name of a computing process 500 allocated to each of the computing nodes 200, an execution period 700 in which each of the computing processes 500 is executed, a deadline which is a required time from a start to an end of a plurality of computing processes 500, precedence constraints 600 defining an execution order among a plurality of computing processes 500, a data communication volume among a plurality of computing processes 500, and an execution time of each of the computing processes 500. Also, a formulation unit 102 creates a constraint condition equation based on respective information input to the model input unit 101.

Further, while referring to the network architecture among a plurality of computing nodes 200, the solution derivation unit 103 derives an allocation and a schedule of the computing process 500 for each computing node 200 that satisfies the constraint condition equation. Also, the distribution unit 104 distributes the allocation and the schedule of the computing process 500 to the respective computing nodes 200. Also, the formulation unit 102 determines an order to execute each of the computing processes based on the precedence constraints 600 among a plurality of computing processes 500, further, create the constraint condition equation satisfying the deadline based on the execution time of each of the computing processes 500 at which each computing process is executed, and a data communication volume among a plurality of computing processes 500. And, the formulation unit 102 calculates an entire period based on the execution period 700 of each of the computing processes 500 ordered based on the precedence constraints 600, and, if the deadline is longer than the entire period, creates the constraint condition equation which does not allocate the other computing process 500 during execution of an excess computing process, in the subsequent entire period, to the computing node 200 to which the excess computing process is to be allocated, which is executed past the entire period.

Further, according to the embodiments described above, the distributed allocation device 100 includes the output unit 111 and the input unit 112. The distributed allocation device 100 further includes a CPU 113 that is a processing circuit that executes a program, and a memory 114 that is a storage unit that stores the program to be executed. The following operation is realized by the CPU 113 executing the program.

That is, a constraint condition equation is created based on respective information input to the input unit 112. And, while referring to the network architecture among a plurality of computing nodes 200, an allocation and a schedule of the computing process 500 are derived for each computing node 200 that satisfies the constraint condition equation. Then, the allocation and the schedule of the computing process 500 are distributed to the output unit 111 of the respective computing nodes 200. The constraint condition equation is created by determining an order to execute each of the computing processes 500 based on the precedence constraints 600 among a plurality of computing processes 500, further, the constraint condition equation is created such that it satisfies the deadline based on the execution time of each of the computing processes 500 at which each computing process is executed, and a data communication volume among a plurality of computing processes 500. And, the constraint condition equation is created by calculating an entire period based on the execution period 700 of each of the computing processes 500 ordered based on the precedence constraints 600, and, the constraint condition equation is created such that, if the deadline is longer than the entire period, the constraint condition equation which does not allocate the other computing process 500 during execution of an excess computing process, in the subsequent entire period, to the computing node 200 to which the excess computing process is to be allocated, which is executed past the entire period.

According to such a configuration, the constraint condition equation is created such that the order in which each computing process 500 is executed is determined based on the precedence constraints 600 among a plurality of computing processes 500, and a plurality of computing processes 500 executed based on the order satisfy, as a whole, the deadline. Therefore, it is no need to set an appropriate deadline for each computing process 500. And, the constraint condition equation is created such that, even if the deadline is longer than the entire period of a plurality of computing processes 500 ordered based on the precedence constraints 600, the other computing process 500 during execution of an excess computing process is not allocated to the computing node 200 to which the excess computing process is to be allocated, in the subsequent entire period. Therefore, the deadline is not set shorter than necessary in relation to the execution period.

In addition, other configurations exemplified in the present specification other than these configurations may be appropriately omitted. That is, if at least these configurations are provided, the effects described above can be produced.

However, even in the case where, at least one of the other configurations exemplified in the present specification is appropriately added to the configurations described above, that is, the case where other configurations exemplified in the present specification which are the configurations that are not described as the above described configurations are added to the above described configuration, the effects described above can likewise be produced.

Further, according to the embodiments described above, a transmission speed among the plurality of computing nodes 200 is input to the model input unit 101. And if a plurality of data communications occur simultaneously among a plurality of computing nodes 200, the formulation unit 102 creates the constraint condition equation by equally dividing the communication speed among a plurality of computing nodes 200 by the number of the data communications. With such a configuration, the constraint condition equation can be created in consideration of resource constraints in the communication path 400.

Further, according to the embodiments described above, if the execution period 700 of each of the computing processes 500 ordered based on the precedence constraints 600 is different from one another, the formulation unit 102 sets the least common multiple of a plurality of execution periods 700 as the entire period, and creates the constraint condition equation in which each computing process 500 is repeatedly executed in accordance with the respective execution periods 700 in the entire period. According to such a configuration, the length of the entire period can be set appropriately under the constraint condition equation so that each computing process 500 is repeatedly executed within the entire period, even if the execution period of different lengths may be set.

Further, according to the embodiments described above, the distributed allocation system includes the distributed allocation device 100, and the network architecture connected to the distributed allocation device 100. The network architecture includes a plurality of computing nodes 200 execute computing processes 500, and network switches 300 connected between a plurality of computing nodes 200.

According to such a configuration, the constraint condition equation is created such that a plurality of computing processes 500 executed based on the precedence constraints 600 satisfy the deadline as a whole. And, the constraint condition equation is created such that, even if the deadline is longer than the entire period of a plurality of computing processes 500, the other computing process 500 during execution of an excess computing process is not allocated to the computing node 200 to which the excess computing process is to be allocated, in the subsequent entire period. Accordingly, a plurality of computing processes 500 can be distributed and allocated to a plurality of computing nodes 200 in the network architecture, while setting appropriate deadlines for a plurality of computing processes 500.

Further, according to the embodiments described above, in the distributed allocation method, a network architecture among a plurality of computing nodes 200, a name of a computing process 500 allocated to each of the computing nodes 200, an execution period 700 in which each of the computing processes 500 is executed, a deadline which is a required time from a start to an end of a plurality of computing processes 500, precedence constraints 600 defining an execution order among a plurality of computing processes 500, a data communication volume among the plurality of computing processes 500, and an execution time of each of the computing processes 500 are input. And a constraint condition equation is created based on respective information input to the input unit 112. And, while referring to the network architecture among a plurality of computing nodes 200, an allocation and a schedule of the computing process 500 are derived to each computing node 200 that satisfies the constraint condition equation. Then, the allocation and the schedule of the computing process 500 are distributed to the respective computing nodes 200. Here, the constraint condition equation is created by determining an order to execute each of the computing processes 500 based on the precedence constraints 600 among a plurality of computing processes 500, further, the constraint condition equation is created such that it satisfies the deadline based on the execution time of each of the computing processes 500 at which each computing process is executed, and a data communication volume among a plurality of computing processes 500. And, the constraint condition equation is created by calculating an entire period based on the execution period 700 of each of the computing processes 500 ordered based on the precedence constraints 600, and, the constraint condition equation is created such that, if the deadline is longer than the entire period, the constraint condition equation which does not allocate the other computing process 500 during execution of an excess computing process in the subsequent entire period, to the computing node 200 to which the excess computing process is to be allocated, which is executed past the entire period.

According to such a configuration, the constraint condition equation is created such that each computing process 500 executed based on the precedence constraints 600 satisfies the deadline as a whole. And, the constraint condition equation is created such that, even if the deadline is longer than the entire period of a plurality of computing processes 500, the other computing process 500 during execution of an excess computing process is not allocated to the computing node 200 to which the excess computing process is to be allocated, in the subsequent entire period. Therefore, it is no need to set an appropriate deadline for each computing process 500, and the deadline is not set shorter than necessary in relation to the execution period.

In addition, other configurations exemplified in the present specification other than these configurations may be appropriately omitted. That is, if at least these configurations are provided, the effects described above can be produced.

However, even in the case where, at least one of the other configurations exemplified in the present specification is appropriately added to the configurations described above, that is, the case where other configurations exemplified in the present specification which are the configurations that are not described as the above described configurations are added to the above described configuration, the effects described above can likewise be produced.

Further, the order of implementation of the respective processes can be changed, unless otherwise specified.

Modification of Embodiments Described Above

Although in the embodiments described above, the dimensions, shapes, relative arrangement relationships, or conditions of implementation of each component may also be described, they are illustrative in all aspects and are not limited to those described herein.

Accordingly, it is understood that numerous other modifications, variations, and equivalents can be devised without departing from the scope of the invention. For example, a case where modifying at least one component, a case where adding or omitting components, and further, a case where extracting at least one component in at least one embodiment and combining it with a component of another embodiment are included.

Further, "one or more" may be included as a component described as "one" in the embodiments described above, so far as consistent with the embodiments.

Furthermore, each component in the embodiments described above is a conceptual unit, and within the scope of the technology disclosed in the present specification, a case where one component is composed of a plurality of structures, a case where one component corresponds to a part of a structure, and further, a case where a plurality of components are provided in one structure are included.

Further, each component in the embodiments described above includes a structure having another structure or shape as long as the same function is exhibited.

Also, the descriptions in the present specification are referred for the every object related to the technique, and none of them are regarded as conventional techniques.

Further, it is understood that each component described in the embodiments described above is assumed as software or firmware, or as hardware corresponding thereto as well, and in both concepts, each component is referred to "unit", or "processing circuit" or the like.

Furthermore, the technique disclosed in the present specification may be a case where each component is distributed and provided in a plurality of devices, specifically, a mode such as a system.

For example, although the memory 114 is shown in FIG. 2 as being installed in the distributed allocation device, the memory 114 may be an external functional unit. In that case, the function of the distributed allocation device may be achieved as a whole by the mutual interaction between the other functional unit in the distributed allocation device and the functional unit in the external functional unit.

Explanation of Reference Signs 100 distributed allocation device, 101 model input unit, 102 formulation unit, 103 solution derivation unit, 104 distribution unit, 111 output unit, 112 input unit, 113, 211 CPU, 114, 212 memory, 115, 213 communication device, 200 computing node, 300 network switch, 400 communication path, 500 computing process, 600 precedence constraint, 700 execution period

The invention claimed is:
1. A distributed allocation device connected, via a network, to a plurality of computing nodes to execute computing processes on data collected at a production line, and to allocate the computing processes to the plurality of computing nodes, the distributed allocation device, comprising:

a processor to execute a program; and a memory to store the program which, when executed by the processor, performs processes of inputting a network architecture among the plurality of computing nodes, a name of computing process allocated to each of the computing nodes, an execution period during which each of the computing processes is executed, a deadline which is a required time from a start to an end of the plurality of computing processes, a precedence constraint defining an execution order among the plurality of computing processes, a data communication volume among the plurality of computing processes, and an execution time of each of the computing processes, creating a constraint condition equation based on respective information, deriving an allocation and a schedule of the computing process for each of the computing nodes satisfying the constraint condition equation while referring to the network architecture among the plurality of computing nodes, and distributing the allocation and the schedule of the computing process to each of the computing nodes, wherein the process of creating the constraint condition equation includes determining an order to execute each of the computing processes based on the precedence constraint among the plurality of computing processes, and creating the constraint condition equation satisfying the deadline based on the execution time of each of the computing processes executed based on the order and the data communication volume among the plurality of computing processes, and the process of creating the constraint condition equation includes calculating an entire period based on the execution period of each of the computing processes ordered based on the precedence constraints, and, if the deadline is longer than the entire period, creating the constraint condition equation which does not allocate an other computing process during execution of an excess computing process to the computing node to which the excess computing process which is executed past the entire period is allocated, in subsequent entire period.

2. The distributed allocation device according to claim 1, wherein the program further performs a process of inputting a transmission speed among the plurality of computing nodes, and if a plurality of data communications occur simultaneously among the plurality of computing nodes, the process of creating the constraint condition equation includes creating the constraint condition equation by equally dividing the transmission speed among the plurality of computing nodes by a number of the data communications that occur simultaneously.

3. The distributed allocation device according to claim 1, wherein if the execution periods of each of the computing processes ordered based on the precedence constraints are different, the process of creating the constraint condition equation includes setting a least common multiple of the plurality of execution periods as the entire period, and creating the constraint condition equation which repeatedly executes each of the computing processes corresponding to the respective execution periods within the entire period.

4. A distributed allocation system, including a distributed allocation device connected, via a network, to a plurality of computing nodes to execute computing processes on data collected at a production line, and to allocate the computing processes to the plurality of computing nodes, and a network architecture connected to the distributed allocation device, the distributed allocation device comprising:

a processor to execute a program; and a memory to store the program which, when executed by the processor, performs processes of inputting a network architecture among the plurality of computing nodes, a name of computing process allocated to each of the computing nodes, an execution period during which each of the computing processes is executed, a deadline which is a required time from a start to an end of the plurality of computing processes, a precedence constraint defining an execution order among the plurality of computing processes, a data communication volume among the plurality of computing processes, and an execution time of each of the computing processes, creating a constraint condition equation based on respective information, deriving an allocation and a schedule of the computing process for each of the computing nodes satisfying the constraint condition equation while referring to the network architecture among the plurality of computing nodes, and distributing the allocation and the schedule of the computing process to each of the computing nodes, wherein the process of creating the constraint condition equation includes determining an order to execute each of the computing processes based on the precedence constraint among the plurality of computing processes, and creating the constraint condition equation satisfying the deadline based on the execution time of each of the computing processes executed based on the order and the data communication volume among the plurality of computing processes, the process of creating the constraint condition equation includes calculating an entire period based on the execution period of each of the computing processes ordered based on the precedence constraints, and, if the deadline is longer than the entire period, creating the constraint condition equation which does not allocate an other computing process during execution of an excess computing process to the computing node to which the excess computing process which is executed past the entire period is allocated, in subsequent entire period, the network architecture includes
the plurality of computing nodes to execute computing processes, and
a network switch to connect between the plurality of computing nodes.

5. A computer implemented distributed allocation method in which computing processes are allocated to a plurality of computing nodes which execute computing processes on data collected at a production line, and connected via a network, the method comprising the steps of:

inputting a network architecture among the plurality of computing nodes, a name of computing process allocated to each of the computing nodes, an execution period during which each of the computing processes is executed, a deadline which is a required time from a start to an end of the plurality of computing processes, a precedence constraint defining an execution order among the plurality of computing processes, a data communication volume among the plurality of computing processes, and an execution time of each of the computing processes;

creating a constraint condition equation based on input respective information;

deriving an allocation and a schedule of the computing process for each of the computing nodes satisfying the constraint condition equation while referring to the network architecture among the plurality of computing nodes;

distributing the allocation and the schedule of the computing process to each of the computing nodes, wherein the constraint condition equation is created such that an order to execute each of the computing processes is determined based on the precedence constraint among the plurality of computing processes, and the deadline is satisfied based on the execution time of each of the computing processes executed based on the order and the data communication volume among the plurality of computing processes, and the constraint condition equation is created such that an entire period is calculated based on the execution period of each of the computing processes ordered based on the precedence constraints, and, if the deadline is longer than the entire period, the other computing process is not allocated during execution of an excess computing process to the computing node to which the excess computing process which is executed past the entire period is allocated, in subsequent entire period.

6. The distributed allocation method according to claim 5, further comprising the step of inputting a transmission speed among the plurality of computing nodes, wherein, if a plurality of data communications occur simultaneously among the plurality of computing nodes, the constraint condition equation is created by equally dividing the transmission speed among the plurality of computing nodes by a number of the data communications that occur simultaneously.

7. The distributed allocation method according to claim 5, wherein, if the execution periods of each of the computing processes ordered based on the precedence constraints are different, a least common multiple of the plurality of execution periods is set as the entire period, and the constraint condition equation is created such that each of the computing processes are repeatedly executed corresponding to the respective execution periods within the entire period.

8. The distributed allocation device according to claim 2, wherein if the execution periods of each of the computing processes ordered based on the precedence constraints are different, the process of creating the constraint condition equation includes setting a least common multiple of the plurality of execution periods as the entire period, and creating the constraint condition equation which repeatedly executes each of the computing processes corresponding to the respective execution periods within the entire period.

9. The distributed allocation method according to claim 6, wherein if the execution periods of each of the computing processes ordered based on the precedence constraints are different, a least common multiple of the plurality of execution periods is set as the entire period, and the constraint condition equation is created such that each of the computing processes are repeatedly executed corresponding to the respective execution periods within the entire period.

\* \* \* \* \*